(12) United States Patent
Lai et al.

(10) Patent No.: US 8,058,969 B1
(45) Date of Patent: Nov. 15, 2011

(54) BIOPRESENCE BASED KEYGUARD MECHANISM

(75) Inventors: Harry Hong-Lun Lai, Overland Park, KS (US); Benjamin P. Blinn, Leawood, KS (US); Mike T. Lundy, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 984 days.

(21) Appl. No.: 11/756,836

(22) Filed: Jun. 1, 2007

(51) Int. Cl.
*H04Q 9/00* (2006.01)
(52) U.S. Cl. ........................ 340/5.52; 455/411
(58) Field of Classification Search .................. 340/5.52; 345/169, 174
See application file for complete search history.

(56) References Cited

U.S. PATENT DOCUMENTS

| 5,153,572 | A | * | 10/1992 | Caldwell et al. ............. 345/174 |
| 2005/0132180 | A1 | * | 6/2005 | Parker ............................... 713/1 |
| 2005/0253815 | A1 | * | 11/2005 | Blacklock et al. ............ 345/169 |
| 2006/0227114 | A1 | * | 10/2006 | Geaghan et al. .............. 345/173 |
| 2007/0049358 | A1 | * | 3/2007 | Kang et al. .................. 455/575.1 |

* cited by examiner

*Primary Examiner* — Brian Zimmerman
*Assistant Examiner* — Omer S Khan

(57) ABSTRACT

A bio-presence based keyguard mechanism for a portable device detects a situation where both a bio-presence sensor and a pressure or displacement sensor are engaged, and then selectively removes an associated keypad from a locked state and places the keypad in an unlocked state. In accordance with one aspect, the keyguard mechanism employs a method for transforming the status of a portable device keypad from a locked state to an unlocked state. Within the method, a signal is received from a pressure or displacement sensor associated with a particular key of the keypad, when the keypad is in a locked state. It is then determined whether a signal is received from a bio-presence sensor associated with the particular key, or with a particular portion of the keypad, within an allotted time period, and if so, the status of the keypad is changed to an unlocked state.

8 Claims, 2 Drawing Sheets

BIOPRESENCE BASED KEYGUARD MECHANISM

SUMMARY

The present invention is defined by the claims below. Embodiments of the present invention provide a keyguard mechanism for a portable device that is bio-presence based. In embodiments, the keyguard mechanism detects a situation where both a bio-presence sensor and a pressure or displacement sensor are engaged, and then selectively removes an associated keypad from a "locked" state, in which the keypad is actually disabled or simply ignores certain key presses, and places the keypad in an "unlocked" state, in which the keypad is enabled and can be used to perform normal input functions. The keyguard mechanism protects against situations where unintentional touching by a person of the keypad, or keypad contact by an inanimate object, "unlocks" the keypad.

In one aspect, the keyguard mechanism employs a method for transforming the status of a portable device keypad from a locked state to an unlocked state. According to the method, a signal is received from a pressure or displacement sensor associated with a particular key of the keypad, when the keypad is in a locked state. It is then determined whether a signal is received from a bio-presence sensor associated with the particular key or with a particular portion of the keypad within an allotted time period measured from when the pressure or displacement sensor signal is received. In situations where the signal is received from the bio-presence sensor within the allotted time period, the status of the keypad is changed to an unlocked state or condition. In an alternative variation, if multiple signals are received from multiple bio-presence sensors within the allotted time period, or nearly simultaneously, the status of the keypad is not changed. This reduces the chance that a keypad is unlocked through unintentional touching by a person (e.g., by bio-presence sensors across multiple keys sensing human touching or presence that is not associated with typical keypad engagement).

Additional advantages and novel features of the present invention will in part be set forth in the description that follows or become apparent to those who consider the attached figures or practice the invention.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
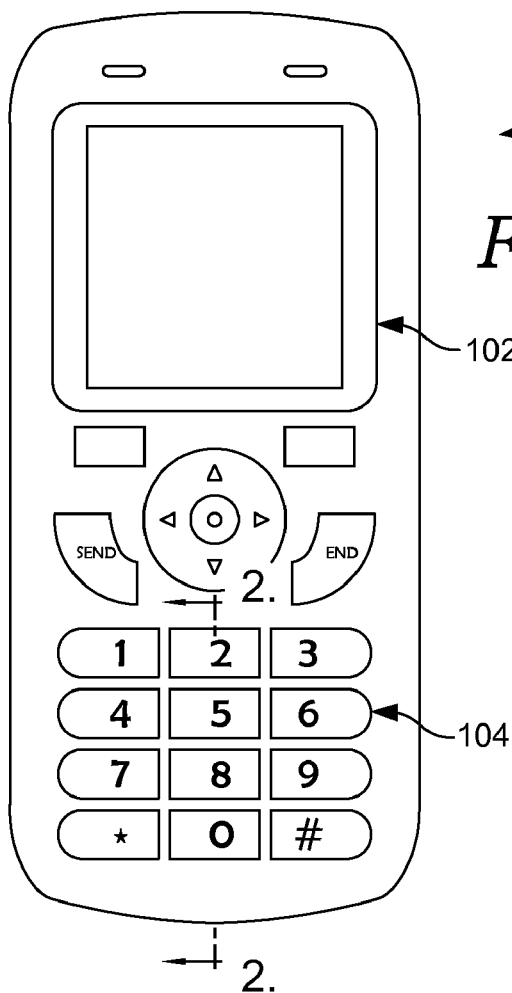
FIG. 1 is a schematic view of an exemplary mobile phone in which the keyguard mechanism is implemented.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Embodiments of the present invention provide systems and methods for biopresence-based keyguard functionality. Specifically, in embodiments, a keyguard mechanism detects a situation where both a bio-presence sensor and a pressure or displacement sensor are engaged, and then selectively removes an associated keypad from a "locked" state and places the keypad in an "unlocked" state. This reduces the chance that a keypad is unlocked through unintentional touching by a person or by an inanimate object. By sensing a biologically-based condition typically associated with touch by a human finger beyond mere displacement of a key on a keypad (e.g., via registering electrical conductivity, body heat, etc.), the opportunity for keypad engagement by unintentional touching by a person, or by an inanimate object, is reduced. This is especially beneficial for mobile phones and other portable electronic devices with external keys, which are often accidentally engaged when a user has the device in the pocket and is in movement. Because many portable devices are in "hibernate" or "power down" state when the keypad hasn't been engaged for a certain time period, accidental key engagement accelerates the draining of the device battery. It should also be understood that descriptions of device keypads as being "enabled" or "disabled" are not limited to keypads being in a fully or completely enabled or disabled state. For instance, a keypad may be considered "locked" and disabled, but some functions on the device may still be accomplished through engaging the keys of the keypad (e.g., making a 9-1-1 emergency call, in situations where unlocking the keypad also requires a particular password to be entered). Additionally, it should be understood that a "locked" keypad may refer to a certain grouping of keys on a keypad being disabled, or ignoring certain pressing of such keys until a biosensor senses a required touching. For instance, the alphanumeric portion of keys on a mobile device may be in a locked or unlocked state, regardless of the state of other keys on the mobile device. Alternatively, all input keys on a device may be considered "locked" or "unlocked" together, according to the configuration of the particular mobile device.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware.

Computer-readable media include both volatile and nonvolatile media, removable and nonremovable media, and contemplates media readable by a database, a switch, and various other devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, as well as magnetic storage devices or any other type of electronic storage device. These technologies can store data momentarily, temporarily, or permanently.

Figure 2:
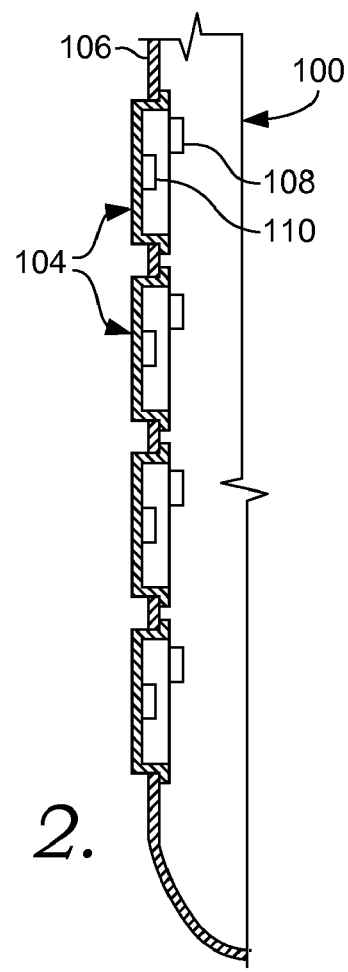
FIG. 2 is a sectional view taken along line 2-2 of FIG. 1 showing the sensors associated with the keyguard mechanism and located within the exemplary mobile phone in accordance with an embodiment of the present invention.

Turning now to FIGS. 1 and 2, and exemplary portable device, in the form of a mobile phone 100, is depicted as an environment in which a biopresence-based keyguard mechanism of the present invention is implemented. The terms "portable device", "mobile device", and "electronic device" are used interchangeable herein and refer generally to the same type of device, which includes, without limitation, mobile phones and other portable electronic devices and communication devices.

The device 100 includes a keypad 104 and a display screen 102. Numerous other keys may be positioned on different surfaces of the device 100 away from a primary keypad 104, as is known with conventional mobile phones 100 and other portable electronic devices. For the purposes of this disclosure, the keypad 104 encompasses any keys that may be engaged by a user anywhere on a device, such as mobile phone 100.

The keypad 104 is formed to face outwardly from a frame 106 of the mobile phone 100, enabling a user to readily engage the keypad 104. A conventional keypad 104 employs pressure or displacement sensors 108 associated with particular keys, to capture the input provided by the user. In the present invention, a set of bio-presence sensors 110 are preferably mounted with individual keys of the keypad 104. The bio-presence sensors 110 may be of any type of sensor that detects human touch, such as heat sensors, electrical conductivity measuring sensors, ultrasound sensors, or other sensors.

Figure 3:
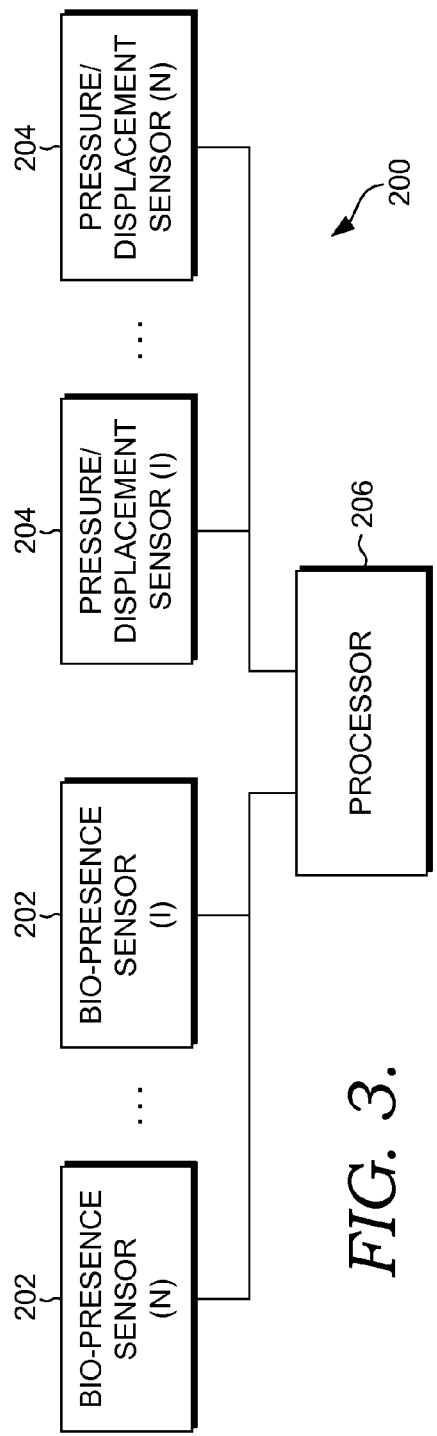
FIG. 3 is a block diagram representative of functional components of the keyguard mechanism in accordance with an embodiment of the present invention.

With additional reference to FIG. 3, a set of functional components 200 of the biopresence-based keyguard mechanism residing within the mobile phone 100 are depicted. One bio-presence sensor 202 (corresponding to sensor 110 of FIG. 2) may be associated with each key of the keypad 104, or may be associated with a region or portion of the keypad 104, with each pressure/displacement sensor 204 (corresponding to sensor 108 of FIG. 2) associated with an individual key. Signals generated by the sensors 202 and 204 are processed by a processor 206, which may be a main processor of the mobile phone 100 or a separate processor (e.g., a microprocessor having associated memory and applications, or an application specific integrated circuit). The processor 206 thereby determines whether to change the status of the keypad 104 from a "locked" condition to an "unlocked" condition.

The bio-presence sensors 202 may be calibrated to generate a signal based on a certain "profile" generally accepted as being representative of a person's finger touching the keypad 104 or an individual key thereof. For instance, if a heat sensor measures a certain temperature, or a temperature of one particular heat sensors is measured as higher than other heat sensors of the keypad 104, the processor 206 takes the signal generated by the sensor or sensors and determines when the signals are representative of displacement of a key and simultaneous touching by a human finger. Likewise, the sensors 202 may respond to a particular electrical conductivity profile associated with touch by a user's finger, and if a threshold conductivity value is reached, or is measured within a particular range of values, a signal is generated and transmitted to the processor 206. The sensors 202 may be configured to generate signals based on direct human touch on the keypad, or touch through a thin object, such as glove liners or the like. As one of skill in the art can appreciate, the sensitivity of the bio-presence sensors 202 implemented in the present invention affect when a human touch condition is registered. Preferably, the sensors 202 are configured to avoid a situation where, for instance, a user's skin through their pants leg is sensed as a human touch condition (e.g., by registering heat or electrical conductivity of the skin). In another embodiment, if the sensors 202 are not calibrated to distinguish such a "touch" or proximity to skin condition (or if the processor 206 is incapable of making such a distinction based on the signals received from the sensors 202), the processor 206 may examine whether multiple bio-presence sensors 202 are generating touch-registering signals either simultaneously, or within a close proximity in time to one another. Such a condition would indicate touching of multiple keys on the keypad 104 at once, generally corresponding to accidental engagement of the keypad 104, such as by a user's leg or torso when the device is in the pocket of an article of clothing. Alternately, a condition sensed by multiple bio-presence sensors 202 where a pre-established set of two or more keys are simultaneously depressed may not be accidental, but purposeful key engagement, allowing for unlocking of the keypad. For instance, if only a pair of keys spaced from one another across a keypad are sensed to be depressed, and this combination key press was preprogrammed into the portable device (e.g., by the manufacturer or the end user), the such a key depression situation may be logged as an intentional key press in terms of unlocking the keypad. Additionally, as referenced above, in an alternative embodiment, each key of a keypad 104 may not have an associated bio-presence sensor 202, so that human touch registering is merely conducted within a certain region of a keypad 104 or on selective keys.

Figure 4:
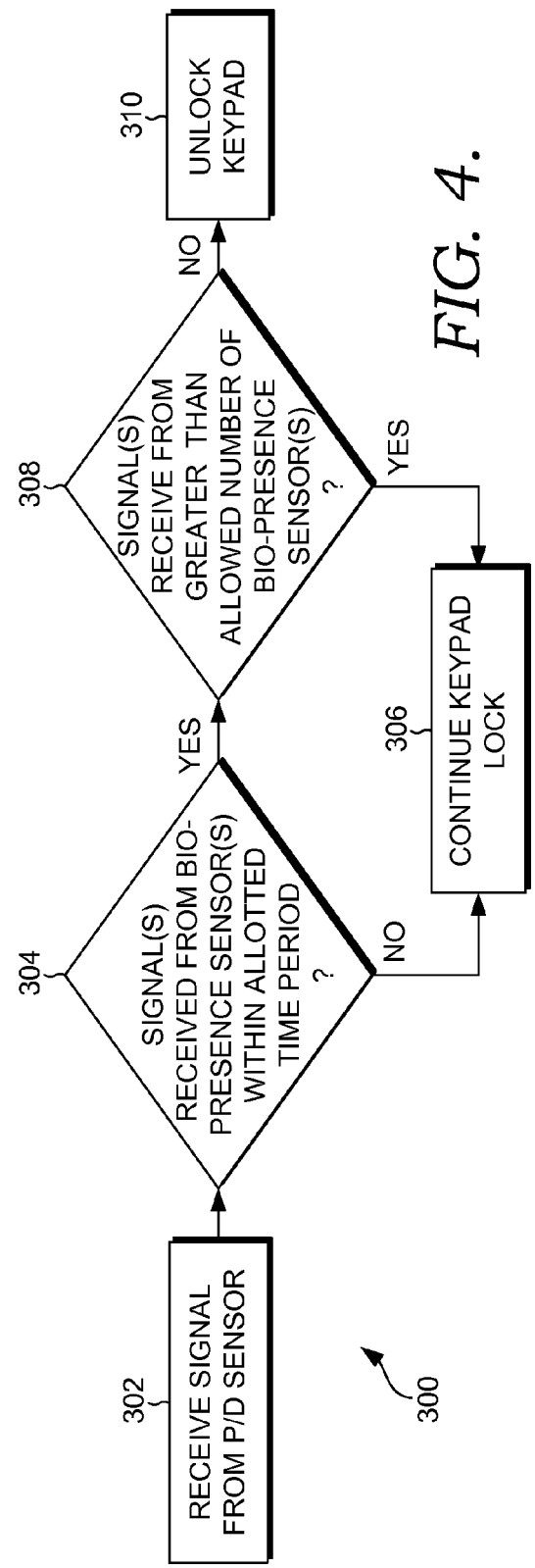
FIG. 4 is a flow chart depicting a method for transforming the status of a portable device keypad from a locked state to an unlocked state in accordance with an embodiment of the present invention.

One exemplary method 300 for transforming the status of a portable device keypad from a locked state to an unlocked state, is depicted in FIG. 4. As referenced above, it should be understood that a "locked" keypad state is not limited to keys being fully disabled, but also includes key having limited functionality in the locked state, or merely that key presses are ignored until an unlocked state is reached.

In accordance with the method 300, in step 302, a signal is received by the processor 206 from a pressure/displacement sensor 204 associated with an individual key, or particular region, of the keypad 104, when the keypad 104 is in the locked state. It is then determined, in step 304, whether one or more signals are received from one or more bio-presence sensors 202 associated with the individual key (or keypad region) within an allotted time period measured from when the pressure/displacement sensor 204 signal is received. The allotted time period can be as short as requiring that the signals be received essentially at the same time, or within a brief amount of time since bio-presence sensors may take longer to sense the condition of human touch than a traditional pressure/displacement sensor. The keypad 104 remains in a locked state, in step 306, when the signals from the one or more bio-presence sensors 202 are not received by the processor 206 within the allotted time period. Alternatively, in step 308, an optional determination is made as to whether signals are received from multiple bio-presence sensors 202 (or above a set number of sensors 202, or a group of sensors 202 that are not associated with a preestablished "unlocking" grouping of key depressions) within the allotted time period of step 304, which likely indicates unintentional touching on the keypad 104. If such a multiple bio-presence sensor 202 engagement condition is realized, then the method moves to step 306 where the keypad 104 remains in a locked state. On the other hand, if signals are only received from one bio-presence sensor 202 (or a sufficiently small number of sensors 202) associated with the particular pressure/displacement sensor 204 engaged in step 302, then the status of the keypad 104 is changed to an unlocked state, in step 310.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for transforming the status of an electronic device keypad from a locked state to an unlocked state, comprising:
    detecting an engagement of the device keypad through pressure or displacement sensing, wherein the device keypad includes physically depressible keys, and wherein the engagement of the device keypad includes a key depression of a key;
    detecting the same engagement of the device keypad through bio-presence sensing; and
    measuring a time period from when the engagement of the device keypad through pressure or displacement sensing is detected, to when the same engagement of the device keypad through bio-presence sensing is detected;
    based on measuring the time period, determining that the device keypad is engaged by human touch when the time period is less than an allotted time period;
    upon determining that the device keypad is engaged by human touch, changing the status of the electronic device keypad from a locked state to an unlocked state.

2. The method of claim 1, wherein:
    changing of the status of the electronic device keypad from the locked state to the unlocked state requires the detection through bio-presence sensing of engagement of an individual key of the device keypad that corresponds to the same individual key of the device keypad that is detected to be engaged through pressure or displacement sensing.

3. The method of claim 1, wherein:
    changing of the status of the electronic device keypad from the locked state to the unlocked state requires the detection through bio-presence sensing of engagement of less than a preestablished number of individual keys of the device keypad within a preestablished period of time.

4. Non-transitory computer-readable media having embodied thereon computer-useable instructions for performing a method of transforming the status of an electronic device keypad from a locked state to an unlocked state, the method comprising:
    detecting an engagement of the device keypad through pressure or displacement sensing, wherein the device keypad includes physically depressible keys, wherein input is provided in response to a key depression of a given key, and wherein the engagement includes simultaneous key depressions of two of the keys;
    detecting the same engagement of the device keypad through bio-presence sensing; and
    for each of the two keys, measuring a time period from when the engagement of the device keypad through pressure or displacement sensing is detected, to when the same engagement of the device keypad through bio-presence sensing is detected;
    based on measuring the time period, determining whether the time period is less than an allotted time period;
    determining whether the two keys are included in a pre-established set of keys that are designated for unlocking the device keypad;
    changing the status of the electronic device keypad from a locked state to an unlocked state when
        (1) the time period is less than the allotted time period and
        (2) the two keys are included in the pre-established set of keys.

5. The media of claim 4, wherein bio-presence sensing includes heat sensing.

6. The media of claim 4, wherein bio-presence sensing includes electrical conductivity sensing.

7. The media of claim 4, wherein:
    changing of the status of the electronic device keypad from the locked state to the unlocked state requires the detection through bio-presence sensing of engagement of an individual key of the device keypad that corresponds to the same individual key of the device keypad that is detected to be engaged through pressure or displacement sensing.

8. The media of claim 4, wherein:
    changing of the status of the electronic device keypad from the locked state to the unlocked state requires the detection through bio-presence sensing of engagement of less than a preestablished number of individual keys of the device keypad within a preestablished period of time.

* * * * *